（12）United States Patent
Kasemi et al.

(10) Patent No.: US 11,053,347 B2
(45) Date of Patent: Jul. 6, 2021

(54) CURING AGENT FOR LOW-EMISSION EPOXY RESIN COMPOSITIONS

(71) Applicant: SIKA TECHNOLOGY AG, Baar (CH)

(72) Inventors: Edis Kasemi, Zürich (CH); Andreas Kramer, Zürich (CH); Ursula Stadelmann, Zürich (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 125 days.

(21) Appl. No.: 16/491,103

(22) PCT Filed: Mar. 13, 2018

(86) PCT No.: PCT/EP2018/056133
§ 371 (c)(1),
(2) Date: Sep. 4, 2019

(87) PCT Pub. No.: WO2018/166997
PCT Pub. Date: Sep. 20, 2018

(65) Prior Publication Data
US 2020/0017629 A1    Jan. 16, 2020

(30) Foreign Application Priority Data
Mar. 14, 2017  (EP) .................................. 17160752

(51) Int. Cl.
*B32B 27/38* (2006.01)
*C09D 163/00* (2006.01)
*C08L 63/00* (2006.01)
*C08G 59/50* (2006.01)
*C08G 59/18* (2006.01)

(52) U.S. Cl.
CPC ............ *C08G 59/184* (2013.01); *B32B 27/38* (2013.01); *C08G 59/182* (2013.01); *C08G 59/5006* (2013.01); *C08L 63/00* (2013.01); *C09D 163/00* (2013.01)

(58) Field of Classification Search
None
See application file for complete search history.

(56) References Cited

U.S. PATENT DOCUMENTS

| 6,562,934 B2 | 5/2003 | Yonehama et al. |
| 8,729,213 B2 | 5/2014 | Raymond et al. |
| 2015/0240111 A1* | 8/2015 | Vogel .................... C08L 63/00 523/429 |
| 2016/0177125 A1* | 6/2016 | Flosser ................ C09D 163/00 523/400 |

FOREIGN PATENT DOCUMENTS

| EP | 1956034 A1 | 8/2008 |
| WO | 2014/108306 A1 | 7/2014 |
| WO | 2016/023839 A1 | 2/2016 |
| WO | 2016/151007 A1 | 9/2016 |

OTHER PUBLICATIONS

May 11, 2018 International Search Report issued in International Patent Application No. PCT/EP2018/056133.

* cited by examiner

*Primary Examiner* — Michael J Feely
(74) *Attorney, Agent, or Firm* — Oliff PLC

(57) ABSTRACT

A curing agent for epoxy resins, containing at least one amine adduct of formula (I) which can be obtained as an addition product of a mixture of a primary diamine, a monoalkylated other diamine and a polyepoxide. The curing agent makes it possible to produce low-odor, low-emission epoxy resin products, in particular coatings, which have a surprisingly low viscosity, a high curing rate, a high final hardness, and a surprisingly appealing surface.

15 Claims, No Drawings

CURING AGENT FOR LOW-EMISSION EPOXY RESIN COMPOSITIONS

TECHNICAL FIELD

The invention relates to the field of curing agents for epoxy resins and epoxy resin compositions, and to coatings, coverings and paints.

PRIOR ART

Epoxy resin products suitable for coating purposes should contain a minimum level of thinners and hence have low emissions, and at the same time nevertheless have a sufficiently low viscosity to have good processability at room temperature. In addition, after application, they should cure very quickly and without defects, even under moist, cold conditions, and form an even, shiny and nontacky surface without haze, spots or craters. Finally, the coating obtained should have high hardness and strength. For visually demanding applications, for example top coverings of floors, it should additionally have a high level of gloss and low tendency to yellow under the influence of light.

For such applications, the prior art discloses curing agents based on cycloaliphatic diamines, such as IPDA in particular, some of which are reacted with epoxy resin or converted to adducts. But these curing agents, according to the degree of adduct formation, are of undesirably high viscosity and have a tendency under moist and cold conditions to give matt surfaces and white spots in the event of early contact with water. Concomitant use of diamines such as MXDA in the adduct formation enables somewhat lower viscosities, but increases the tendency to yellowing under the influence of light and/or worsens surface quality, especially in the case of curing under moist and cold conditions.

Partly alkylated primary diamines are known as curing agents for epoxy resins, for example from U.S. Pat. Nos. 6,562,934, 8,729,213, WO 2014/108306 and WO 2016/023839. These amines enable low-emission epoxy resin products having good properties. They are typically used in free form, not converted to adducts.

It is also possible to use them in adduct form. Such adducts do have comparatively low viscosity, but the curing speed and the final hardnesses attained in epoxy resin products formulated therewith are often insufficiently high.

SUMMARY OF THE INVENTION

It is therefore an object of the present invention to provide a curing agent for epoxy resins which enables epoxy resin products of minimum viscosity that cure rapidly at ambient temperatures and especially also under cold conditions and at the same time enable high quality coatings with an even, shiny surface.

This object is achieved by the curing agent as claimed in claim 1. The curing agent comprises at least one mixed adduct amine of the formula (I) that can be obtained from adduct formation from a mixture of primary diamine and a partly alkylated further diamine with a polyepoxide.

The curing agent of the invention enables low-odor and low-emission epoxy resin products having surprisingly lower viscosity and a surprisingly nice surface compared to curing agents based on corresponding adduct amines that are prepared separately, with comparably good other properties of the epoxy resin products obtained thereby, such as, in particular, curing speed, final hardness and tendency to yellowing.

Further aspects of the invention are the subject of further independent claims.

Particularly preferred embodiments of the invention are the subject of the dependent claims.

WAYS OF EXECUTING THE INVENTION

The invention provides a curing agent for epoxy resins comprising at least one adduct amine of the formula (I)

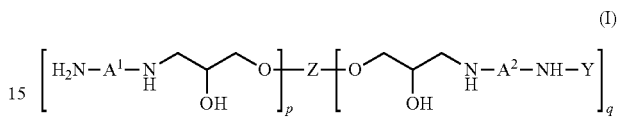

where $A^1$ is an alkylene radical which has 6 to 15 carbon atoms and optionally has cyclic components and optionally secondary or tertiary amino groups, $A^2$ is an alkylene radical different than $A^1$ that has 2 to 10 carbon atoms, Y is an alkyl or cycloalkyl or aralkyl radical having 1 to 20 carbon atoms, Z is a (p+q)-valent hydrocarbyl radical optionally containing ether oxygen and having a molecular weight in the range from 56 to 1,500 g/mol, and p and q are independently 1 or 2 or 3 and (p+q) is 2 or 3 or 4.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

"Amine hydrogen" refers to the hydrogen atoms of primary and secondary amino groups, "Amine hydrogen equivalent weight" refers to the mass of an amine or an amine-containing composition that contains one molar equivalent of amine hydrogen.

Substance names beginning with "poly", such as polyamine, polyol or polyepoxide, refer to substances containing, in a formal sense, two or more of the functional groups that occur in their name per molecule.

A "thinner" refers to a substance which is soluble in an epoxy resin and lowers its viscosity, and which is not chemically incorporated into the epoxy polymer in the curing process.

"Viscosity" refers to the dynamic viscosity or shear viscosity which is defined by the ratio between the shear stress and the shear rate (speed gradient) and is determined as described in the description or the working examples.

"Molecular weight" refers to the molar mass (in g/mol) of a molecule. "Average molecular weight" refers to the number average $M_n$ of a polydisperse mixture of oligomeric or polymeric molecules, which is typically determined by means of gel permeation chromatography (GPC) against polystyrene as standard.

"Room temperature" refers to a temperature of 23° C.

A dotted line in the formulae in each case represents the bond between a substituent and the corresponding molecular radical.

Preferably, A¹ is an alkylene radical which has 6 to 12 carbon atoms and optionally has cyclic components and optionally secondary or tertiary amino groups.

More preferably, A¹ is selected from the group consisting of 2-methyl-1,5-pentylene, 1,6-hexylene, 2,2(4),4-trimethyl-1,6-hexamethylene, 1,3-cyclohexylenebis(methylene), 1,4-cyclohexylenebis(methylene), 1,3-phenylenebis(methylene), 1,4-phenylenebis(methylene), 1,2-cyclohexylene, 1,3-cyclohexylene, 1,4-cyclohexylene, (1,5,5-trimethylcyclohexan-1-yl)methane-1,3, 4(2)-methyl-1,3-cyclohexylene, 3-aza-1,5-pentylene, 3,6-diaza-1,8-octylene, 3,6,9-triaza-1,11-undecylene, 3,6,9,12-tetraaza-1,14-tetradecylene, 3,6,9,12,15-pentaaza-1,17-heptadecylene, 4-aza-2,6-heptylene, 4-aza-1,7-heptylene, 4,7-diaza-1,10-decylene and 7-aza-1,13-tridecylene.

Among these, preference is given to 2-methyl-1,5-pentylene, 2,2(4),4-trimethyl-1,6-hexamethylene, 1,3-cyclohexylenebis(methylene), 1,4-cyclohexylenebis(methylene), 1,3-phenylenebis(methylene), 1,4-phenylenebis(methylene), (1,5,5-trimethylcyclohexan-1-yl)methane-1,3, 4(2)-methyl-1,3-cyclohexylene, 3-aza-1,5-pentylene, 3,6-diaza-1,8-octylene, 3,6,9-triaza-1,11-undecylene, 4-aza-1,7-heptylene and 4,7-diaza-1,10-decylene.

These A¹ radicals are readily available and enable epoxy resin products with speedy curing and very high final strength.

More particularly, A¹ is selected from the group consisting of 2,2(4),4-trimethyl-1,6-hexamethylene, 1,3-cyclohexylenebis(methylene), (1,5,5-trimethylcyclohexan-1-yl)methane-1,3 and 4(2)-methyl-1,3-cyclohexylene.

These A¹ radicals enable epoxy resin products having a particularly low tendency to yellowing.

Most preferably, A¹ is (1,5,5-trimethylcyclohexan-1-yl)methane-1,3. This A¹ radical enables epoxy resin products having a particularly attractive combination of speedy curing, high final strength and good surface quality. Preferably, A² is an alkylene radical having 2 to 6, especially 2 or 3, carbon atoms. These A² radicals enable epoxy resin products having particularly low viscosity and particularly nice surfaces.

Preferably, A² is selected from the group consisting of 1,2-ethylene, 1,2-propylene and 2-methyl-1,5-pentylene.

More preferably, A² is 1,2-ethylene or 1,2-propylene, especially 1,2-propylene.

These A² radicals enable epoxy resin products having very particularly good processability, particularly speedy curing, particularly nice surfaces and a particularly low tendency to yellowing.

In a preferred embodiment of the invention, A² is 1,2-propylene and A¹ is selected from the group consisting of 2-methyl-1,5-pentylene, 1,6-hexylene, 2,2(4),4-trimethyl-1,6-hexamethylene, 1,3-cyclohexylenebis(methylene), 1,4-cyclohexylenebis(methylene), 1,3-phenylenebis(methylene), 1,4-phenylenebis(methylene), 1,2-cyclohexylene, 1,3-cyclohexylene, 1,4-cyclohexylene, (1,5,5-trimethylcyclohexan-1-yl)methane-1,3, 4(2)-methyl-1,3-cyclohexylene, 3-aza-1,5-pentylene, 3,6-diaza-1,8-octylene, 3,6,9-triaza-1,11-undecylene, 3,6,9,12-tetraaza-1,14-tetradecylene, 3,6,9,12,15-pentaaza-1,17-heptadecylene, 4-aza-2,6-heptylene, 4-aza-1,7-heptylene, 4,7-diaza-1,10-decylene and 7-aza-1,13-tridecylene.

Preferably, A¹ here is 2,2(4),4-trimethyl-1,6-hexamethylene, 1,3-cyclohexylenebis(methylene), (1,5,5-trimethylcyclohexan-1-yl)methane-1,3 or 4(2)-methyl-1,3-cyclohexylene, especially (1,5,5-trimethylcyclohexan-1-yl)methane-1,3.

Preferably, Y is an alkyl or cycloalkyl or aralkyl radical having 3 to 10 carbon atoms.

In a preferred embodiment, Y is an alkyl radical having 6 to 10 carbon atoms, especially 2-ethylhexyl. Such a curing agent is of very particularly low viscosity and hence enables epoxy resin products having particularly good processability.

In a further preferred embodiment, Y is 2-phenylethyl. Such a curing agent is particularly easily available.

In a particularly preferred embodiment, Y is a radical of the formula

where

R¹ is a hydrogen radical or is methyl or phenyl, and

R² is a five- or six- or seven-membered cycloalkyl or aryl radical which has 4 to 7 carbon atoms and is optionally alkyl-substituted.

Preferably, R¹ is a hydrogen radical or is methyl, especially a hydrogen radical.

Preferably, R² is cyclohexyl, phenyl or 1-naphthyl.

More preferably, Y is selected from the group consisting of 2-ethylhexyl, 2-phenylethyl, cyclohexylmethyl, benzyl, 1-phenylethyl and 1-naphthylmethyl.

Most preferably, Y is benzyl, 1-phenylethyl or 1-naphthylmethyl, most preferably benzyl. Such a curing agent is of particularly low viscosity and enables epoxy resin products of particularly good processability with speedy curing and particularly nice surfaces.

Preferably, Z is a di-, tri- or tetravalent hydrocarbyl radical optionally having ether oxygen and having a molecular weight in the range from 56 to 1'000, especially 56 to 500, g/mol.

More preferably, Z is the residue of a di-, tri- or tetravalent aryl glycidyl ether after removal of the glycidoxy groups. Such a curing agent enables epoxy resin products having speedy curing, high hardness and nice surfaces.

More particularly, Z is the residue of bisphenol A diglycidyl ether, bisphenol F diglycidyl ether, bisphenol A/F diglycidyl ether or novolak glycidyl ethers after removal of the glycidoxy groups.

Z is preferably derived from liquid bisphenol A resin, liquid bisphenol F resin, liquid bisphenol A/F resin or phenol-novolak glycidyl ethers having an average functionality in the range from 2.5 to 3.8.

Most preferably, Z is the residue of bisphenol A diglycidyl ether after removal of the glycidoxy groups. Such a curing agent is of particularly low viscosity.

Preferably, (p+q) is 2. Thus, p and q are preferably each 1.

The invention further provides a process for producing the curing agent described, characterized in that an amine mixture comprising at least one amine of the formula (II) and at least one monoalkylated amine of the formula (III) is reacted with at least one glycidyl ether of the formula (IV)

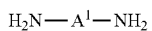  (II)

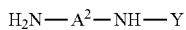  (III)

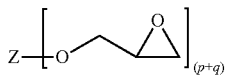  (IV)

where $A^1$, $A^2$, Y, Z, p and q have the definitions already given.

Such a reaction is also referred to as an adduct formation.

In this process, the reaction between the amine mixture and the glycidyl ether is preferably conducted in such a way that the primary amino groups are in a stoichiometric excess over the epoxy groups.

Preferably, the molar ratio of the sum total of amine of the formula (II) and amine of the formula (III) relative to the epoxy groups is in the range from 1.5/1 to 15/1, more preferably 2/1 to 15/1, especially 2.5/1 to 10/1.

Preferably, the weight ratio between the amine of the formula (II) and the amine of the formula (III) is in the range from 5/95 to 95/5, preferably 10/90 to 90/10, especially 20/80 to 80/20. Preferably, the temperature in the reaction is in the range from 40 to 120° C., especially 60 to 100° C.

Preferably, the amine mixture is initially charged and warmed up, and then the glycidyl ether is metered in, ensuring that the temperature of the reaction mixture remains within the temperature range specified.

The amine of the formula (II) is preferably selected from the group consisting of 1,5-diamino-2-methylpentane (MPMD), hexane-1,6-diamine, 2,2(4),4-trimethylhexamethylenediamine (TMD), 1,3-bis(aminomethyl)cyclohexane, 1,4-bis(aminomethyl)cyclohexane, 1,3-bis(aminomethyl)benzene, 1,4-bis(aminomethyl)benzene, 1,2-diaminocyclohexane, 1,3-diaminocyclohexane, 1,4-diaminocyclohexane, 1-amino-3-aminomethyl-3,5,5-trimethylcyclohexane (isophoronediamine or IPDA), 2- and 4-methyl-1,3-diaminocyclohexane and mixtures thereof, diethylenetriamine (DETA), triethylenetetramine (TETA), tetraethylenepentamine (TEPA), pentaethylenehexamine (PEHA), dipropylenetriamine (DPTA), N-(2-aminoethyl)propane-1,3-diamine (N3 amine), N,N'-bis(3-aminopropyl)ethylenediamine (N4 amine) and bis(hexamethylene)triamine (BHMT).

Particular preference is given to TMD, 1,3-bis(aminomethyl)cyclohexane, IPDA or 2(4)-methyl-1,3-diaminocyclohexane.

Most preferred is IPDA.

The amine of the formula (III) is preferably selected from the group consisting of N-benzylethane-1,2-diamine, $N^1$-benzylpropane-1,2-diamine or $N^2$-benzylpropane-1,2-diamine or a mixture thereof, $N^1$-(1-phenylethyl)propane-1,2-diamine or $N^2$-(1-phenylethyl)propane-1,2-diamine or a mixture thereof, $N^1$-(1-naphthylmethyl)propane-1,2-diamine or $N^2$-(1-naphthylmethyl)propane-1,2-diamine or a mixture thereof, N-benzylpropane-1,3-diamine, $N^1$-benzyl-2-methylpentane-1,5-diamine or $N^5$-benzyl-2-methylpentane-1,5-diamine or a mixture thereof, N-benzylhexane-1,6-diamine, N-benzyl-1,3-bis(aminomethyl)cyclohexane, N-benzyl-1,3-bis(aminomethyl)benzene, N-2-ethylhexyl-1,3-bis(aminomethyl)benzene and N-(2-phenylethyl)-1,3-bis(aminomethyl)benzene (constituent of styrenized MXDA, obtainable as Gaskamine® 240 from Mitsubishi Gas Chemical).

Particular preference is given to $N^1$-benzylpropane-1,2-diamine or $N^2$-benzylpropane-1,2-diamine or a mixture thereof.

The glycidyl ether of the formula (IV) is preferably selected from liquid bisphenol A resins, liquid bisphenol F resins, liquid bisphenol A/F resins and phenol novolaks having an average functionality in the range from 2.5 to 3.8.

Preferably, the amine mixture used in the process described additionally comprises at least one dialkylated amine of the formula (IIIa)

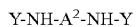  (IIIa)

where $A^2$ and Y have the definitions already given.

Preferably, the amine of the formula (III) used in the process described and any amine of the formula (IIIa) additionally present are part of a reaction mixture from the partial alkylation of at least one amine of the formula $A^2(NH_2)_2$ with at least one alkylating agent.

Preferably, the alkylation is a reductive alkylation, where the alkylating agent used is an aldehyde or ketone and hydrogen.

The aldehyde or ketone here is preferably selected from the group consisting of 2-ethylhexanal, cyclohexylcarbaldehyde, benzaldehyde, acetophenone and 1-naphthaldehyde, especially benzaldehyde.

Preference is given to conducting the reductive alkylation in the presence of a suitable catalyst. Preferred catalysts are palladium on charcoal (Pd/C), platinum on charcoal (Pt/C), Adams' catalyst or Raney nickel, especially palladium on charcoal or Raney nickel.

When molecular hydrogen is used, the reductive alkylation is preferably worked in a pressure apparatus at a hydrogen pressure of 5 to 150 bar, especially 10 to 100 bar. This can be effected in a batchwise process or preferably in a continuous process.

The reductive alkylation is preferably conducted at a temperature in the range from 40 to 120° C., especially 60 to 100° C.

Especially in the case that $A^2$ is an alkylene radical having 2 to 6, especially 2 or 3, carbon atoms, the amine of the formula $A^2(NH_2)_2$ is preferably used in a stoichiometric excess over the aldehyde or ketone and amine of the formula $A^2(NH_2)_2$ unconverted after the alkylation is at least partly removed from the reaction mixture, especially by means of stripping. If desired, the reaction mixture may then be purified further, especially by freeing the amine of the formula (III) at least partly of the amine of the formula (IIIa) by means of distillation.

Preferably, the curing agent of the invention has a content of the amine of the formula $A^2(NH_2)_2$ in which $A^2$ is an alkylene radical having 2 to 6, especially 2 or 3, carbon atoms of less than 2.5% by weight, preferably less than 1% by weight. Such a curing agent enables epoxy resin products having particularly nice surfaces.

If $A^2$ is an alkylene radical having 7 to 10 carbon atoms, the parent amine of the formula $A^2(NH_2)_2$ for the reductive alkylation is preferably used in such an amount that 1 to 1.8, especially 1 to 1.5, mol of aldehyde or ketone is present per mole of amine of the formula $A^2(NH_2)_2$.

The invention further provides the reaction product from the process described for preparation of the curing agent of the invention.

More particularly, this reaction product, in addition to the adduct amine of the formula (I), comprises at least one amine of the formula (II), at least one amine of the formula (III), at least one adduct amine of the formula (V) and at least one adduct amine of the formula (VI)

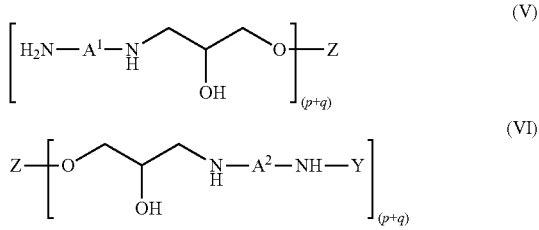

where $A^1$, $A^2$, Y, Z, p and q have the definitions already given.

In addition, the reaction product may comprise at least one amine of the formula (IIIa) and at least one adduct amine from the reaction of an amine of the formula (IIIa) with the glycidyl ether of the formula (IV).

In addition, the reaction product typically comprises proportions of further adduct amines, especially proportions of higher adduct amines as formed by reaction of an amine of the formula (II) or (III) with more than one glycidyl ether of the formula (III).

The curing agent described may comprise further amines that do not correspond to the amines of the formula (II) or (III) or (IIIa) used for preparation of the adduct of the formula (I) or adduct amines derived therefrom from the reaction with the glycidyl ether of the formula (IV).

The curing agent described optionally comprises at least one accelerator.

Preferred accelerators are acids or compounds hydrolyzable to acids, tertiary amines, salts of tertiary amines, quaternary ammonium salts, amidines, guanidines, phenols, Mannich bases, phosphites or compounds having mercapto groups, especially acids, tertiary amines or Mannich bases.

Particular preference is given to salicylic acid or 2,4,6-tris(dimethylaminomethyl)phenol or a combination thereof.

The curing agent described optionally comprises at least one thinner, especially benzyl alcohol, 2-phenoxyethanol, cardanol (from cashewnutshell oil, comprising 3-(8,11,14-pentadecatrienyl)phenol as its main constituent), styrenized phenol or aromatic hydrocarbon resins containing phenol groups, especially benzyl alcohol or cardanol.

The invention further provides an epoxy resin composition comprising
   a resin component comprising at least one epoxy resin and
   a curing agent component comprising the above-described curing agent and/or the reaction product from the process described.

Suitable epoxy resins are standard industrial epoxy resins. These are obtained in a known manner, for example from the oxidation of the corresponding olefins or from the reaction of epichlorohydrin with the corresponding polyols, polyphenols or amines.

Particularly suitable epoxy resins are what are called liquid polyepoxide resins, referred to as "liquid resin" hereinafter. These have a glass transition temperature below 25° C.

Likewise possible as epoxy resins are what are called solid resins which have a glass transition temperature above 25° C. and can be comminuted to powders that are pourable at 25° C.

A preferred epoxy resin in the resin component is a liquid resin based on a bisphenol, especially a diglycidyl ether of bisphenol A, bisphenol F or bisphenol A/F, as commercially available, for example, from Dow, Huntsman or Momentive. These liquid resins have a low viscosity for epoxy resins and good properties in the cured state as a coating. They may contain proportions of solid bisphenol A resin or novolak glycidyl ethers.

The resin component may additionally comprise a reactive diluent, especially a reactive diluent having at least one epoxy group, especially a glycidyl ether of mono- or polyhydric phenols or aliphatic or cycloaliphatic alcohols, especially butanediol diglycidyl ether, hexanediol diglycidyl ether, polyoxypropylene glycol diglycidyl ether, cardanol glycidyl ether or glycidyl ethers of natural alcohols such as $C_8$- to $C_{10}$-, $C_{12}$- to $C_{14}$- or $C_{13}$- to $C_{15}$-alkyl glycidyl ethers.

The epoxy resin composition optionally comprises further constituents, especially auxiliaries and additives typically used in epoxy resin compositions, especially solvents, thinners, film-forming auxiliaries, extenders, polymers, inorganic and/or organic fillers, fibers, pigments, rheology modifiers, adhesion improvers, stabilizers against oxidation, heat, light or UV radiation, flame-retardant substances, surface-active substances or biocides.

In the epoxy resin composition, the ratio of the number of groups reactive toward epoxy groups relative to the number of epoxy groups is preferably in the range from 0.5 to 1.5, especially 0.7 to 1.2.

The resin component and the curing agent component of the epoxy resin composition are each stored in a separate container. Further constituents of the epoxy resin composition may be present as a constituent of the resin component or of the curing agent component; further constituents reactive toward epoxy groups are preferably a constituent of the curing agent component. It is likewise possible that further constituents are present as a dedicated, separate component.

The components are storable, meaning that they can be stored prior to use for several months up to one year or longer, without any change in their respective properties to a degree of relevance to their use.

For the use of the epoxy resin composition, the components are mixed with one another shortly before or during the application.

The mixing of the components is effected by means of a suitable method; it can be effected continuously or batchwise. The mixing is especially effected at ambient temperature, which is typically within the range from about 5 to 50° C., preferably about 10 to 30° C.

The mixing of the two components commences the curing by chemical reaction. This involves reaction of the amine hydrogens present in the epoxy resin composition and of any further groups present that are reactive toward epoxy groups with the epoxy groups, with ring opening (addition reaction) thereof. As a result mainly of this reaction, the composition polymerizes and ultimately cures.

The curing typically proceeds at a temperature in the range from 0 to 150° C. It preferably proceeds at ambient temperature and typically extends over a few days to weeks. The duration depends upon factors including the temperature, the reactivity of the constituents and the stoichiometry thereof, and on the presence of accelerators.

The invention thus further provides a cured composition obtained from the curing of an epoxy resin composition as described in the present document.

The epoxy resin composition is applied to at least one substrate, the following substrates being particularly suitable:
   glass, glass ceramic, concrete, mortar, brick, tile, gypsum and natural rocks such as granite or marble;

metals or alloys such as aluminum, iron, steel or nonferrous metals, or surface-finished metals or alloys such as galvanized or chromed metals, leather, textiles, paper, wood, woodbase materials bonded with resins, e.g. phenolic, melamine or epoxy resins, resin-textile composites or further polymer composites;

polymers, especially rigid or flexible PVC, ABS, polycarbonate (PC), polyamide (PA), polyesters, PMMA, epoxy resins, PUR, POM, PO, PE, PP, EPM or EPDM, where the polymers have optionally been surface-treated by means of plasma, corona or flames;

fiber-reinforced plastics, such as carbon fiber-reinforced plastics (CRP), glass fiber-reinforced plastics (GRP) or sheet molding compounds (SMC);

coated substrates such as powder-coated metals or alloys;

paints or varnishes.

The substrates can be pretreated if required prior to the application of the epoxy resin composition.

The epoxy resin composition described is advantageously usable as fiber composite matrix for fiber composite materials (composites) such as, in particular, CRP or GRP, or as a potting compound or casting resin, sealant, adhesive, covering, coating, paint, varnish, seal, basecoat or primer.

It is especially usable as a covering, coating, paint, varnish, seal, basecoat or primer for construction and industrial applications, especially as a floor covering or floor coating for interiors such as offices, industrial halls, gym halls or cooling spaces, or outdoors for balconies, terraces, parking decks, bridges or roofs, as a protective coating for concrete, cement, metals, plastics or wood, for example for surface sealing of wood constructions, vehicles, loading areas, tanks, silos, shafts, pipelines, machines or steel constructions, for example of ships, piers, offshore platforms, lock gates, hydroelectric power plants, river constructions, swimming pools, wind turbines, bridges, chimneys, cranes or sheet-pile walls, or as an undercoat, tiecoat or anticorrosion primer or for hydrophobization of surfaces.

It is especially usable additionally as an adhesive, especially as a bodywork adhesive, sandwich element adhesive, half-shell adhesive for rotor blades of wind turbines, bridge element adhesive or anchoring adhesive, Especially when it is used as a coating, covering or paint, it is possible to apply a further coating, further covering or further paint to the fully or partly cured epoxy resin composition, in which case said further layer may likewise be an epoxy resin composition, or else another material, especially a polyurethane or polyurea coating.

Particularly advantageously, the epoxy resin composition described is used as a coating.

As a coating, the epoxy resin composition is advantageously used in a method of coating, wherein it has a fluid consistency with low viscosity and good leveling properties, and is especially applied as a self-leveling or thixotropic coating to predominantly even areas or as a paint. Preferably, the epoxy resin composition on application, immediately after the resin component and the curing agent component have been mixed, has a viscosity, measured at 20° C., in the range from 0.3 to 4 Pa·s, more preferably 0.3 to 2 Pa·s, especially 0.3 to 1.7 Pa·s. The mixed composition is applied to a substrate within the processing time over an area as a thin film having a layer thickness of typically about 50 μm to about 5 mm, typically at ambient temperature. Application is effected especially by pouring onto the substrate to be coated and subsequent homogeneous distribution with the aid, for example, of a coating bar or a notched trowel. Application can also be effected with a brush or roller or in the form of a spray application, for example as an anticorrosion coating on steel.

The application of the epoxy resin composition gives rise to an article comprising the cured composition from the curing of the epoxy resin composition described. The cured composition is especially in the form of a coating.

The epoxy resin composition described features advantageous properties. It has low odor and low emissions and particularly good processibility, gives good wetting of the substrates and cures speedily and without defects, even at cool ambient temperatures. The curing gives rise to high-quality epoxy resin products having high hardness and an even, nontacky and shiny surface.

EXAMPLES

Working examples are adduced hereinafter, which are intended to give detailed elucidation of the invention described. It will be appreciated that the invention is not restricted to these described working examples.

"AHEW" stands for amine hydrogen equivalent weight.

"EEW" stands for epoxy equivalent weight.

"Standard conditions" refer to a temperature of 23±1° C. and a relative air humidity of 50±5%. "SCC" stands for "standard climatic conditions".

Description of Measuring Methods:

Viscosity was measured on a thermostated Rheotec RC30 cone-plate viscometer (cone diameter 50 mm, cone angle 1°, cone tip-plate distance 0.05 mm, shear rate 10 s$^{-1}$).

Amine value was determined by means of titration (with 0.1N HClO$_4$ in acetic acid versus crystal violet).

Substances Used:

Araldite® GY 250: bisphenol A diglycidyl ether, EEW about 187.5 g/eq (from Huntsman)

Araldite® DY-E: monoglycidyl ether of C$_{12}$ to C$_{14}$ alcohols, EEW around 290 g/eq (from Huntsman)

IPDA 3-aminomethyl-3,5,5-trimethylcyclohexylamine, AHEW 42.6 g/eq (Vestamin® IPD from Evonik)

1,3-BAC: 1,3-bis(aminomethyl)cyclohexane, AHEW 35.5 g/eq (from Mitsubishi Gas Chemical)

MXDA: 1,3-bis(aminomethyl)benzene, AHEW 34 g/eq (from Mitsubishi Gas Chemical)

Cardanol: from cashewnutshell oil, comprising 3-(8,11,14-pentadecatrienyl)phenol as its main constituent, Cardolite® NX-2026 (from Cardolite Corp.)

N-Benzylpropane-1,2-diamine

A round-bottom flask was initially charged with 444.8 g (6 mol) of propane-1,2-diamine under a nitrogen atmosphere at room temperature. With good stirring, a solution of 212.2 g (2 mol) of benzaldehyde in 1500 mL of isopropanol was slowly added dropwise, and the mixture was stirred for 2 hours. The reaction mixture was then hydrogenated in a continuous hydrogenation apparatus with a Pd/C fixed bed catalyst at a hydrogen pressure of 90 bar, a temperature of 85° C. and a flow rate of 5 mL/min. To monitor the reaction, IR spectroscopy was used to check whether the imine band at about 1665 cm$^{-1}$ had disappeared. Thereafter, the hydrogenated solution was concentrated on a rotary evaporator at 65° C., removing unreacted propane-1,2-diamine and isopropanol. A clear, pale yellowish liquid was obtained. 300 g of this were distilled at 80° C. under reduced pressure, with collection of 237.5 g of distillate at a vapor temperature of 60 to 63° C. and 0.08 to 0.09 bar. A colorless liquid having an amine value of 682 mg KOH/g was obtained, which, by ¹H NMR, was a mixture of N¹-benzylpropane-1,2-diamine and N²-benzylpropane-1,2-diamine in a ratio of about 2/1 and had a GC purity of >97%.

Production of Curing Agents Comprising Adduct Amines of the Formula (I):

Adduct A1:

An initial charge of 17.0 g (0.1 mol) of IPDA and 16.4 g (0.1 mol) of N-benzylpropane-1,2-diamine under a nitrogen atmosphere was heated to 70° C. and then, with good stirring, 10.7 g (0.057 mol of epoxy groups) of Araldite® GY 250 was added gradually, with the temperature of the reaction mixture from 70 to 80° C. After 1 hour at 80° 0, the reaction mixture was cooled down. What was obtained was a clear, pale yellowish liquid having an amine value of 494 mg KOH/g, a viscosity of 2.03 Pa's at 20° C. and an AHEW of about 68.7 g/eq.

Adduct A2:

An initial charge of 25.6 g (0.15 mol) of IPDA and 8.2 g (0.05 mol) of N-benzylpropane-1,2-diamine under a nitrogen atmosphere was heated to 70° C. and then, with good stirring, 10.7 g (0.057 mol of epoxy groups) of Araldite® GY 250 was added gradually, with the temperature of the reaction mixture from 70 to 80° C. After 1 hour at 80° C., the reaction mixture was cooled down. What was obtained was a clear, pale yellowish liquid having an amine value of 497 mg KOH/g, a viscosity of 4.90 Pa·s at 20° C. and an AHEW of about 64.2 g/eq.

Adduct A3:

An initial charge of 8.5 g (0.05 mol) of IPDA and 24.7 g (0.15 mol) of N-benzylpropane-1,2-diamine under a nitrogen atmosphere was heated to 70° C. and then, with good stirring, 10.7 g (0.057 mol of epoxy groups) of Araldite® GY 250 was added gradually, with the temperature of the reaction mixture from 70 to 80° C. After 1 hour at 80° C., the reaction mixture was cooled down. What was obtained was a clear, pale yellowish liquid having an amine value of 501 mg KOH/g, a viscosity of 1.04 Pa's at 20° C. and an AHEW of about 74.0 g/eq.

Preparation of Adducts without Adduct Amine of the Formula (I) Comparison

Adduct R1:

An initial charge of 34.1 g (0.2 mol) of IPDA under a nitrogen atmosphere was heated to 70° C. and then, with good stirring, 10.7 g (0.057 mol of epoxy groups) of Araldite® GY 250 was added gradually, with the temperature of the reaction mixture from 70 to 80° 0. After 1 hour at 80° C., the reaction mixture was cooled down. What was obtained was a clear, pale yellowish liquid having an amine value of 497 mg KOH/g, a viscosity of 13.70 Pa-s at 20° C. and an AHEW of about 60.2 g/eq.

Adduct R2:

An initial charge of 32.9 g (0.2 mol) of N-benzylpropane-1,2-diamine under a nitrogen atmosphere was heated to 70° C. and then, with good stirring, 10.7 g (0.057 mol of epoxy groups) of Araldite® GY 250 was added gradually, with the temperature of the reaction mixture from 70 to 80° C. After 1 hour at 80° C., the reaction mixture was cooled down. What was obtained was a clear, pale yellowish liquid having an amine value of 503 mg KOH/g, a viscosity of 0.53 Pa-s at 20° C. and an AHEW of about 80.2 g/eq.

Adduct R3:

An initial charge of 17.0 g (0.1 mol) of IPDA and 13.6 g (0.1 mol) of MXDA under a nitrogen atmosphere was heated to 70° C. and then, with good stirring, 10.7 g (0.057 mol of epoxy groups) of Araldite® GY 250 was added gradually, with the temperature of the reaction mixture from 70 to 80° C. After 1 hour at 80° C., the reaction mixture was cooled down. What was obtained was a clear, pale yellowish liquid having an amine value of 534 mg KOH/g, a viscosity of 2.80 Pa·s at 20° C. and an AHEW of about 55.7 g/eq.

Adduct R4:

An initial charge of 17.0 g (0.1 mol) of IPDA and 14.2 g (0.1 mol) of 1,3-BAC under a nitrogen atmosphere was heated to 70° C. and then, with good stirring, 10.7 g (0.057 mol of epoxy groups) of Araldite® GY 250 was added gradually, with the temperature of the reaction mixture from 70 to 80° C. After 1 hour at 80° C., the reaction mixture was cooled down. What was obtained was a clear, pale yellowish liquid having an amine value of 529 mg KOH/g, a viscosity of 3.79 Pa·s at 20° C. and an AHEW of about 56.5 g/eq.

Production of Epoxy Resin Compositions

Examples 1 to 16

For each example, the ingredients specified in tables 1 and 2 were mixed in the specified amounts (in parts by weight) of the curing agent component by means of a centrifugal mixer (SpeedMixer™ DAC 150, FlackTek Inc.) and stored with exclusion of moisture.

The ingredients of the resin component specified in tables 1 and 2 were likewise processed and stored.

Subsequently, the two components of each composition were processed by means of the centrifugal mixer to give a homogeneous liquid and this was tested immediately as follows:

10 minutes after mixing, the viscosity was determined at 20° C. ("Viscosity (10')").

A first film was coated onto a glass plate in a layer thickness of 500 μm, and this was stored/cured standard climatic conditions. König hardness (König pendulum hardness, measured according to DIN EN ISO 1522) was determined on this film after 1 day ("König hardness (1d SCC)"), after 2 days ("König hardness (2d SCC)"), after 4 days ("König hardness (4d SCC)"), after 7 days ("König hardness (7d SCC)") and after 14 days ("König hardness (14d SCC)"). After 14 days, the appearance of the film was assessed (designated "Appearance (SCC)" in the table). A "nice" film referred to one which was clear and had a shiny and nontacky surface with no structure. "Structure" refers to any kind of marking or pattern on the surface.

A second film was coated onto a glass plate in a layer thickness of 500 μm and, immediately after application, this was stored/cured at 8° C. and 80% relative humidity for 7 days and then under standard climatic conditions for 3 weeks. 24 hours after application, a polypropylene bottletop beneath which a small moist sponge had been positioned was placed onto the film. After a further 24 hours, the sponge and the lid were removed and positioned at a new point on the film, where it was removed again and repositioned after 24 hours, a total of 4 times. Subsequently, the appearance of this film was assessed (designated as "Appearance (8°/80%)" in the tables), in the same way as described for Appearance (SCC). Also reported in each case here was the number of white marks that were visible in the film as a result of the moist sponge. Again, the K nig hardness was determined on the films thus cured, in each case after 7 days at 8° C. and 80% relative humidity ("König hardness (7d 8°/80%)"), then after a further 2 days under SCC ("König hardness (+2d SCC)"), 7 days under SCC ("König hardness (+7d SCC)") and 14 d under SCC ("König hardness (+14d SCC)").

A further measure of yellowing that was determined was the change in color after weathering stress in a weathering tester. For this purpose, a further film in a layer thickness of 500 m was coated onto a glass plate and stored/cured under standard climatic conditions for 2 weeks and then subjected to weathering stress in a weathering tester of the Q-Sun Xenon Xe-1 type with a Q-SUN Daylight-Q optical filter and a xenon lamp with a light intensity of 0.51 W/m² at 340 nm at a temperature of 65° C. for 72 hours (Q-Sun (72 h)).

Subsequently, the color difference ΔE of the film thus subjected to weathering stress as compared with the corresponding unstressed film was determined by means of an NH310 colorimeter from Shenzen 3NH Technology Co. LTD, equipped with silicon photoelectric diode detector, light source A, color space measurement interface CIE L*a*b*C*H*. ΔE values of 0.5 to 1.5 represent a minor difference in color, 1.5 to 3 a slight difference in color, 3 to 6 a distinct difference in color, and more than 6 a major difference in color.

The results are reported in tables 1 to 2.

The examples labeled "(Ref.)" are comparative examples.

TABLE 1

Composition and properties of examples 1 to 8.

| | Example | | | | | | | |
|---|---|---|---|---|---|---|---|---|
| | 1 | 2 (Ref.) | 3 | 4 (Ref.) | 5 | 6 (Ref.) | 7 | 8 (Ref.) |
| Resin comp.: | | | | | | | | |
| Araldite ® GY 250 | 167.2 | 167.2 | 167.2 | 167.2 | 167.2 | 167.2 | 167.2 | 167.2 |
| Araldite ® DY-E | 31.8 | 31.8 | 31.8 | 31.8 | 31.8 | 31.8 | 31.8 | 31.8 |
| Curing agent comp.: | | | | | | | | |
| Adduct A1 | 68.7 | — | 68.7 | — | — | — | — | — |
| Adduct A2 | — | — | — | — | 64.2 | — | — | — |
| Adduct A3 | — | — | — | — | — | — | 74.0 | — |
| Adduct R1 | — | 30.1 | — | 30.1 | — | 45.2 | — | 15.1 |
| Adduct R2 | — | 40.1 | — | 40.1 | — | 20.1 | — | 60.2 |
| Benzyl alcohol | 29.7 | 29.7 | — | — | 27.7 | 27.7 | — | — |
| Cardanol | — | — | 29.7 | 29.7 | — | — | 31.7 | 31.7 |
| Viscosity (10') [Pa · s] | 1.15 | 1.27 | 2.02 | 2.17 | 1.50 | 1.81 | 1.57 | 1.70 |
| König hardness [s] | | | | | | | | |
| (1 d SCC) | 27 | 29 | 63 | 78 | 45 | 36 | 49 | 43 |
| (2 d SCC) | 94 | 104 | 122 | 144 | 122 | 127 | 102 | 109 |
| (4 d SCC) | 164 | 161 | 162 | 158 | 174 | 168 | 150 | 140 |
| (7 d SCC) | 181 | 179 | 176 | 183 | 188 | 174 | 167 | 162 |
| (14 d SCC) | 190 | 185 | 189 | 192 | 206 | 196 | 162 | 179 |
| Appearance (SCC) | nice | nice | nice | nice | nice | nice | nice | nice |
| Q-Sun (72 h) ΔE | 2.1 | 2.8 | 2.3 | 2.2 | 2.3 | 2.1 | 2.1 | 3.1 |
| König hardness [s] | | | | | | | | |
| (7 d 8°/80%) | 38 | 32 | 59 | 60 | 46 | 36 | 45 | 38 |
| (+2 d SCC) | 123 | 136 | 127 | 118 | 130 | 134 | 119 | 127 |
| (+7 d SCC) | 164 | 176 | 155 | 168 | 168 | 167 | 154 | 155 |
| (+14 d SCC) | 179 | 193 | 167 | 179 | 178 | 179 | 155 | 162 |
| Appearance (8°/80%) | nice | nice | nice | sl. mk.[1] | sl. mk.[1] | matt/ sl. mk.[1] | nice | nice |
| Number of marks | 1 | 1 | 1 | 1 | 1 | 1 | 1 | 1 |

[1]slight marking on the surface

TABLE 2

Composition and properties of examples 9 to 16

| | Example | | | | | | | |
|---|---|---|---|---|---|---|---|---|
| | 9 (Ref.) | 10 (Ref.) | 11 (Ref.) | 12 (Ref.) | 13 (Ref.) | 14 (Ref.) | 15 (Ref.) | 16 (Ref.) |
| Resin comp.: | | | | | | | | |
| Araldite ® GY 250 | 167.2 | 167.2 | 167.2 | 167.2 | 167.2 | 167.2 | 167.2 | 167.2 |
| Araldite ® DY-E | 31.8 | 31.8 | 31.8 | 31.8 | 31.8 | 31.8 | 31.8 | 31.8 |
| Curing agent comp.: | | | | | | | | |
| Adduct R1 | 60.2 | — | — | — | 60.2 | — | — | — |
| Adduct R2 | — | 80.2 | — | — | — | 80.2 | — | — |
| Adduct R3 | — | — | 55.7 | — | — | — | 55.7 | — |

TABLE 2-continued

Composition and properties of examples 9 to 16

| | Example | | | | | | | |
|---|---|---|---|---|---|---|---|---|
| | 9 (Ref.) | 10 (Ref.) | 11 (Ref.) | 12 (Ref.) | 13 (Ref.) | 14 (Ref.) | 15 (Ref.) | 16 (Ref.) |
| Adduct R4 | — | — | — | 56.5 | — | — | — | 56.5 |
| Benzyl alcohol | 25.8 | 34.4 | 23.9 | 24.2 | — | — | — | — |
| Cardanol | — | — | — | — | 25.8 | 34.4 | 23.9 | 24.2 |
| Viscosity (10') [Pa · s] | 3.20 | 0.90 | 2.24 | 3.17 | 6.24 | 1.86 | 4.58 | 5.90 |
| König hardness [s] | | | | | | | | |
| (1 d SCC) | 63 | 6 | 67 | 80 | 97 | 31 | 123 | 127 |
| (2 d SCC) | 140 | 25 | 111 | 108 | 148 | 71 | 148 | 153 |
| (4 d SCC) | 185 | 66 | 164 | 160 | 179 | 125 | 176 | 174 |
| (7 d SCC) | 195 | 94 | 179 | 178 | 198 | 145 | 179 | 180 |
| (14 d SCC) | 200 | 111 | 174 | 179 | 195 | 160 | 176 | 176 |
| Appearance (SCC) | nice | nice | nice | sl. mk.[1] | nice | nice | sl. mk.[1] | sl. mk.[1] |
| Q-Sun (72 h) ΔE | 1.8 | 3.8 | 5.2 | 3.4 | 2.3 | 3.1 | 3.8 | 2.1 |
| König hardness [s] | | | | | | | | |
| (7 d 8°/80%) | 57 | 11 | 49 | 60 | 70 | 34 | 70 | 83 |
| (+2 d SCC) | 126 | 55 | 92 | 97 | 109 | 95 | 105 | 109 |
| (+7 d SCC) | 154 | 123 | 140 | 150 | 132 | 119 | 139 | 91 |
| (+14 d SCC) | 175 | 122 | 154 | 154 | 136 | 120 | 154 | 126 |
| Appearance (8°/80%) | matt | nice | matt/mk.[2] | matt | matt | nice | mk.[2] | matt |
| Number of marks | 4 | none | 4 | 4 | 4 | 1 | 4 | 4 |

[1]slight marking on the surface
[2]hazy marking on the surface

The invention claimed is:

1. A curing agent for epoxy resins comprising at least one adduct amine of the formula (I)

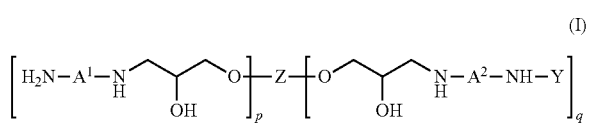

where
  $A^1$ is an alkylene radical which has 6 to 15 carbon atoms and optionally has cyclic components and optionally secondary or tertiary amino groups,
  $A^2$ is an alkylene radical different than $A^1$ and that has 2 to 10 carbon atoms,
  Y is an alkyl or cycloalkyl or aralkyl radical having 1 to 20 carbon atoms,
  Z is a (p+q)-valent hydrocarbyl radical optionally containing ether oxygen and having a molecular weight in the range from 56 to 1,500 g/mol, and
  p and q are independently 1 or 2 or 3 and (p+q) is 2 or 3 or 4.

2. The curing agent as claimed in claim 1, wherein $A^1$ is selected from the group consisting of 2-methyl-1,5-pentylene, 1,6-hexylene, 2,2(4),4-trimethyl-1,6-hexamethylene, 1,3-cyclohexylenebis(methylene), 1,4-cyclohexylenebis(methylene), 1,3-phenylenebis(methylene), 1,4-phenylenebis(methylene), 1,2-cyclohexylene, 1,3-cyclohexylene, 1,4-cyclohexylene, (1,5,5-trimethylcyclohexan-1-yl)methane-1,3, 4(2)-methyl-1,3-cyclohexylene, 3-aza-1,5-pentylene, 3,6-diaza-1,8-octylene, 3,6,9-triaza-1,11-undecylene, 3,6,9,12-tetraaza-1,14-tetradecylene, 3,6,9,12,15-pentaaza-1,17-heptadecylene, 4-aza-2,6-heptylene, 4-aza-1,7-heptylene, 4,7-diaza-1,10-decylene and 7-aza-1,13-tridecylene.

3. The curing agent as claimed in claim 1, wherein $A^2$ is an alkylene radical having 2 to 6 carbon atoms.

4. The curing agent as claimed in claim 1, wherein $A^2$ is 1,2-propylene and $A^1$ is selected from the group consisting of 2-methyl-1,5-pentylene, 1,6-hexylene, 2,2(4),4-trimethyl-1,6-hexamethylene, 1,3-cyclohexylenebis(methylene), 1,4-cyclohexylenebis(methylene), 1,3-phenylenebis(methylene), 1,4-phenylenebis(methylene), 1,2-cyclohexylene, 1,3-cyclohexylene, 1,4-cyclohexylene, (1,5,5-trimethylcyclohexan-1-yl)methane-1,3, 4(2)-methyl-1,3-cyclohexylene, 3-aza-1,5-pentylene, 3,6-diaza-1,8-octylene, 3,6,9-triaza-1,11-undecylene, 3,6,9,12-tetraaza-1,14-tetradecylene, 3,6,9,12,15-pentaaza-1,17-heptadecylene, 4-aza-2,6-heptylene, 4-aza-1,7-heptylene, 4,7-diaza-1,10-decylene and 7-aza-1,13-tridecylene.

5. The curing agent as claimed in claim 1, wherein Y is a radical of the formula

where
  $R^1$ is a hydrogen radical or is methyl or phenyl, and
  $R^2$ is a five- or six- or seven-membered cycloalkyl or aryl radical which has 4 to 7 carbon atoms and is optionally alkyl-substituted.

6. The curing agent as claimed in claim 1, wherein Y is selected from the group consisting of 2-ethylhexyl, 2-phenylethyl, cyclohexylmethyl, benzyl, 1-phenylethyl and 1-naphthylmethyl.

7. The curing agent as claimed in claim 1, wherein Z is the residue of a di-, tri- or tetravalent aryl glycidyl ether after removal of the glycidoxy groups.

8. A process for producing the curing agent as claimed in claim 1, wherein an amine mixture comprising at least one amine of the formula (II) and at least one monoalkylated amine of the formula (III) is reacted with at least one glycidyl ether of the formula (IV).

 (II)

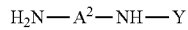 (III)

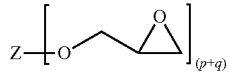 (IV)

9. The process as claimed in claim 8, wherein the molar ratio of the sum total of amine of the formula (II) and amine of the formula (III) relative to the epoxy groups is in the range from 1.5/1 to 15/1.

10. The process as claimed in claim 8, wherein the amine mixture used in the process additionally comprises at least one dialkylated amine of the formula (IIIa)

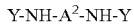 (IIIa)

11. The process as claimed in claim 8, wherein the amine of the formula (III) used in the process and any amine of the formula (IIIa) additionally present are part of a reaction mixture from the partial alkylation of at least one amine of the formula $A^2(NH_2)_2$ with at least one alkylating agent.

12. A reaction product from the process as claimed in claim 8.

13. An epoxy resin composition comprising
   a resin component comprising at least one epoxy resin and
   a curing agent component comprising the curing agent as claimed in claim 1.

14. A method comprising applying the epoxy resin composition as claimed in claim 13 as a coating onto a substrate.

15. A cured composition obtained from the curing of an epoxy resin composition as claimed in claim 13.

* * * * *